(12) United States Patent
Brück (10) Patent No.: US 7,874,144 B2
(45) Date of Patent: Jan. 25, 2011

(54) METHOD FOR CONTROLLING A FUEL MIXTURE, EXHAUST GAS SYSTEM HAVING A MOBILE INTERNAL COMBUSTION ENGINE AND VEHICLE HAVING AN EXHAUST GAS SYSTEM

(75) Inventor: Rolf Brück, Bergisch Gladbach (DE)

(73) Assignee: Emitec Gesellschaft fuer Emissionstechnologie mbH, Lohmar (DE)

(*) Notice: Subject to any disclaimer, the term of this patent is extended or adjusted under 35 U.S.C. 154(b) by 365 days.

(21) Appl. No.: 11/636,741

(22) Filed: Dec. 11, 2006

(65) Prior Publication Data

US 2007/0089402 A1 Apr. 26, 2007

Related U.S. Application Data

(63) Continuation of application No. PCT/EP2005/005968, filed on Jun. 3, 2005.

(30) Foreign Application Priority Data

Jun. 9, 2004 (DE) .................. 10 2004 027 907

(51) Int. Cl.
*F01N 3/00* (2006.01)
(52) U.S. Cl. ................. 60/285; 60/274; 60/276; 60/299
(58) Field of Classification Search ............ 60/274, 60/276, 285, 299, 309
See application file for complete search history.

(56) References Cited

U.S. PATENT DOCUMENTS

| | | | | |
|---|---|---|---|---|
| 33,942 | A * | 12/1861 | Katsuno et al. | 159/32 |
| 3,945,204 | A * | 3/1976 | Knapp | 60/274 |
| 4,132,615 | A * | 1/1979 | Linder et al. | 204/428 |
| 4,543,176 | A * | 9/1985 | Harada et al. | 204/406 |
| 4,912,926 | A * | 4/1990 | Kumagai et al. | 60/276 |
| 4,941,318 | A | 7/1990 | Matsuoka | |
| 5,083,427 | A * | 1/1992 | Anderson | 60/274 |
| 5,974,787 | A | 11/1999 | Lemire et al. | |
| 6,244,045 | B1 * | 6/2001 | Purvis | 60/274 |
| 6,450,018 | B1 | 9/2002 | Moebius | |

(Continued)

FOREIGN PATENT DOCUMENTS

CN 1370092 A 9/2002

(Continued)

OTHER PUBLICATIONS (Author unknown): "Lambda Sensoren im Kat integriert",("Lambda-sensors integrated in the Cat"), IAAA 2003.

(Continued)

*Primary Examiner*—Binh Q. Tran
(74) *Attorney, Agent, or Firm*—Laurence A. Greenberg; Werner H. Stemer; Ralph E. Locher (57) ABSTRACT

A method for controlling a fuel mixture in an exhaust gas system of a mobile internal combustion engine having at least one catalytic converter in an exhaust gas line, includes carrying out the control with an individual control probe in the interior of the at least one catalytic converter. An exhaust gas system and a vehicle having the exhaust gas system, are also provided.

13 Claims, 4 Drawing Sheets

U.S. PATENT DOCUMENTS

| | | | |
|---|---|---|---|
| 6,516,610 B2 * | 2/2003 | Hodgson | 60/286 |
| 6,828,156 B2 * | 12/2004 | Ohsuga et al. | 436/135 |
| 6,898,927 B2 * | 5/2005 | Morinaga et al. | 60/284 |
| 7,007,457 B2 | 3/2006 | Ellmer | |
| 7,111,393 B2 | 9/2006 | Brück | |
| 7,114,325 B2 * | 10/2006 | Surnilla et al. | 60/276 |
| 7,131,320 B2 | 11/2006 | Weinowski et al. | |
| 2002/0112957 A1 | 8/2002 | Clyde et al. | |
| 2004/0071609 A1 | 4/2004 | Bruck | |
| 2004/0074094 A1 | 4/2004 | Brück | |
| 2004/0159358 A1 | 8/2004 | Brück | |
| 2005/0022382 A1 | 2/2005 | Bruck et al. | |

FOREIGN PATENT DOCUMENTS

| | | |
|---|---|---|
| DE | 196 29 554 C2 | 2/1998 |
| DE | 100 52 002 C2 | 5/2002 |
| DE | 102 08 872 C1 | 8/2003 |
| DE | 102 37 512 C1 | 11/2003 |
| DE | 103 03 911 A1 | 8/2004 |
| EP | 0 800 617 B1 | 10/1997 |
| EP | 0 999 352 A2 | 5/2000 |
| JP | 57028110 U | 2/1982 |
| JP | 61152962 A | 7/1986 |
| JP | 7-238823 | 9/1995 |
| WO | 02075125 A1 | 9/2002 |
| WO | WO 02/075126 A1 | 9/2002 |
| WO | 2004/007922 A1 | 1/2004 |

OTHER PUBLICATIONS

Laurell et al: "A Metal Substrate with Integrated Oxygen Sensor. Functionality and Influence on Air/ Fuel Ratio Control", Mar. 3-6, 2003.

Laurell et al, A Metal Substrate with Integrated Oxygen Sensor; Functionality and Influence on Air/Fuel Ratio Control, 2003 SAE International 2003-01-0818.

(Author not named) "IAAA 2003: Lambda Sensoren im Kat integriert", dated 2003.

Laurell, et al., "A Metal Substrate with Integrated Oxygen Sensor: Functionality and influence on Air/Fuel Ration Control", dated Mar. 3, 2003.

Japanese Office Action dated Nov. 17, 2009.

* cited by examiner

METHOD FOR CONTROLLING A FUEL MIXTURE, EXHAUST GAS SYSTEM HAVING A MOBILE INTERNAL COMBUSTION ENGINE AND VEHICLE HAVING AN EXHAUST GAS SYSTEM

CROSS-REFERENCE TO RELATED APPLICATIONS

This is a continuation, under 35 U.S.C. §120, of copending International Patent Application PCT/EP2005/005968, filed Jun. 3, 2005, which designated the United States; this application also claims the priority, under 35 U.S.C. §119, of German Patent Application DE 10 2004 027 907.1, filed Jun. 9, 2004; the prior applications are herewith incorporated by reference in their entirety.

BACKGROUND OF THE INVENTION

Field of the Invention

The invention relates to a method for controlling a fuel mixture through the use of a control probe in the exhaust gas system of a mobile internal combustion engine. Furthermore, an exhaust gas system including a mobile internal combustion engine and a vehicle having the exhaust gas system, are also proposed. The preferred field of use of such exhaust gas systems or methods is the automobile sector.

It is known to use sensors and/or probes in exhaust gas systems of mobile internal combustion engines in order to obtain detailed information about operating states of the internal combustion engines and/or exhaust gas treatment devices which are integrated in the exhaust gas system.

Thus, it is known, for example, to use an oxygen sensor connected to an electronic device to determine the state of ageing of an exhaust gas catalytic converter. The sensor has an oxygen-sensitive region for measuring the partial pressure of oxygen in the exhaust gas. The state of the ageing of the catalytic converter is determined by the control device through the use of that measurement variable since the oxygen load on the catalytic converter can be used as a characteristic variable for its functional capability (referred to as onboard diagnostics).

Furthermore, it is also known to monitor at least part of the exhaust gas in the exhaust gas system and thus to influence the supply of fuel to the internal combustion engine. Thus, in internal combustion engines which have warmed up, or after a predefinable exhaust gas temperature has been reached, oxygen sensors are used to perform lambda control on the internal combustion engine. Lambda ($\lambda$), referred to as the excess air factor, describes the ratio of the current air/fuel ratio to the stochiometric air/fuel ratio and is often used as a characteristic value for the combustion processes. In that context, a first oxygen sensor which is disposed upstream of a catalytic converter is used as a control probe, and a second oxygen sensor which is connected downstream of the exhaust gas catalytic converter is used as a trimming probe. The first oxygen sensor is used to determine lambda oscillation with a specific amplitude and frequency, which result from the combustion processes in the internal combustion engine. They are sensed through the use of the first oxygen sensor which is positioned upstream of the catalytic converter. A person skilled in the art is familiar with the procedure described herein and does not require any further explanation.

The lambda oscillation of the exhaust gas composition which is present at the input end of the catalytic converter is increasingly smoothed as it passes through the catalytic converter due to its oxygen storage capability. The result is a decrease in amplitude of the lambda oscillations along the catalytic converter. Given a high oxygen storage capability, it is almost impossible to obtain evidence of lambda oscillation anymore at the output end, for example. The amplitude of the lambda oscillation for which evidence can still be obtained after the exhaust gas has run through a partial section or the entire catalytic converter is therefore a measure of the oxygen storage capability of the section of the catalytic converter or of the entire catalytic converter.

In that case, the lambda value generally settles to a constant mean value of the lambda oscillation present upstream of the catalytic converter. That mean value is sensed by the second sensor downstream of the catalytic converter, which is the so-called trimming probe. The trimming probe is then used to set a mean value of lambda, which cannot be determined or set precisely through the use of the oxygen sensor or control sensor which is mounted upstream (of the catalytic converter). Causes therefor are, for example, so-called "poisoning", that is to say adverse influences due to the high oxygen concentration or other influences of the untreated exhaust gas on that control sensor which is positioned upstream. As a result, the control sensor which is positioned upstream changes its measuring behavior so that even though the dynamic oscillating behavior continues to be satisfactorily sensed, without the trimming probe it is not possible to obtain precise information about the (mean) lambda value over a relatively long period of use of the control sensor which is mounted upstream.

In the chemical balance, the lambda value emerges directly from the partial pressure of the oxygen. For that reason, the lambda value, and thus also the oxygen storage capability of the catalytic converter, can be determined by measuring the partial pressure of the oxygen with the second oxygen sensor (trimming probe) which is disposed downstream of the catalytic converter. In that way, it is then possible to install a "slow" correction routine which compensates for the ageing/poisoning of the control sensor which is mounted upstream.

The profile, which is determined through the use of the oxygen sensors, of the partial pressure values of the oxygen or of other parameters which describe the exhaust gas composition, also permits conclusions to be drawn about the effectiveness or the scope of the combustion in the individual combustion chambers of the internal combustion engine. The values which are generated therewith can thus also be used to perform lambda control on the internal combustion engine with, for example, influence being exerted on a composition of a fuel/air mixture, ignition time, pressures prevailing during the combustion, etc.

A problem when such oxygen sensors or other control probes are used is also their sensitivity to water. If the sensitive region of the control probe comes into contact with water, the functional capability of the control probe is generally no longer ensured. For that reason, a number of different embodiments of control probes or lambda probes which are intended to prevent contact of the sensitive area with water have already been proposed. Usually, such oxygen sensors or lambda sensors are brought to the operating temperature through the use of an electric heating conductor structure. It is also known to provide special screening devices, grilles or coatings which function as a way of resisting water. Due to the fact that those probes or sensors are in contact with the exhaust gas line or are guided through it, they generally have a lower temperature than the exhaust gas. It is also necessary to take into account the fact that the temperature of the exhaust gas varies greatly due to the different operating states of the internal combustion engine. There is thus repeatedly the risk that the sensor or the housing surrounding the sensor will reach temperatures which can result in condensation of water out of the exhaust gas.

SUMMARY OF THE INVENTION

It is accordingly an object of the invention to provide a simplified method for controlling a fuel mixture with a control probe in an exhaust gas system of a mobile internal combustion engine, an exhaust gas system having a mobile internal combustion engine, being cost-effective and having a simple structure, and a vehicle having an exhaust gas system, which at least partially alleviate the hereinafore-mentioned disadvantages of the heretofore-known methods and devices of this general type.

With the foregoing and other objects in view there is provided, in accordance with the invention, a method for controlling a fuel mixture. The method comprises providing a mobile internal combustion engine exhaust gas system having an exhaust gas line with at least one catalytic converter. The fuel mixture control is carried out with an individual or single control probe in an interior of the at least one catalytic converter.

In the first instance, the invention departs from the preconceptions of experts in the art, according to which the fuel mixture of the internal combustion engine is controlled with a multiplicity of control probes (one for the dynamic lambda oscillation and one for the slow-acting trimming). As a result, the method can already be carried out at relatively low cost and with relatively little expenditure on electronics, with the susceptibility to faults of this system for controlling the fuel mixture being automatically reduced. In order to protect against condensation water, the aggressive ambient conditions due to the untreated exhaust gas and the large fluctuations of temperature, this one control probe is disposed in the interior of the at least one catalytic converter. This means, in particular, that parts of the control probe extend into internal regions of the catalytic converter. It is clear that the control probe has to be made to extend out of the exhaust gas system or exhaust gas line so that the control probe is not disposed completely in the interior of the catalytic converter. The catalytic converter itself represents a type of damping element for the temperatures, pollutant concentrations, etc. In particular, it is a thermal mass so that in this case a somewhat sluggish thermal behavior occurs. To this extent, the fluctuations of the exhaust gas temperature as a consequence of different operating states of the internal combustion engine do not affect the control probe to the extent that they would a control probe which projects freely into the exhaust gas line. The control probe is preferably an oxygen sensor or what is referred to as a lambda probe.

Investigations have shown in this case that the integration of the individual control probe in the catalytic converter surprisingly ensures precise results over a long operating time. It has been found that the influences of the exhaust gas (for example temperature fluctuations, pressure fluctuations, etc.) already decrease considerably over the first millimeters of the catalytic converter, so that in this way a significant "protection against ageing or protection against poisoning" of the control probe has been realized. More detailed information will be given on this subject in the text below. At the same time, there is still sufficient lambda oscillation, which can be used to perform lambda control on the internal combustion engine. In such an embodiment it is advantageously possible to use appropriate types of control probes. For example, in a range up to 50% reduction of the "incoming" lambda oscillation at the catalytic converter, it is still possible to use so-called jump probes (for example a zircon dioxide probe with a sudden change in the output signal at a lambda value of approximately 1) since they are particularly economical and still sufficiently sensitive. Given further reduction of the lambda oscillation amplitudes, for example as far as 5%, so-called linear probes can preferably be used.

At this point it is to be noted that this does not mean that no further sensors at all should be provided in the exhaust gas system. It is thus possible, for example, to connect nitrogen oxygen sensors downstream of the catalytic converter, which sensors determine the nitrogen oxygen concentration in the exhaust gas after contact with the catalytic converter. However, the measured values which are obtained in that way are not used to perform lambda control on the internal combustion engine.

In accordance with another mode of the invention, the control probe is heated after the internal combustion engine starts, in such a way that it has a temperature of at least 70° C. [degrees Celsius] before the at least one catalytic converter has reached 95° Celsius. The control probe can be heated passively in this case (substantially only through the use of the temperature of the exhaust gas in contact with it) and/or actively, for example through the use of a heating element, an electric heater, etc. As has already been stated at the beginning, such control probes usually have particular sensitivity to water. It is proposed in this case that the control probe have a temperature of at least 70° C. (at which the phenomenon of condensation no longer occurs to a significant extent due to the configuration in the catalytic converter proposed in this case) before the catalytic converter has reached 95° C. In addition, the catalytic converter also makes a large surface available which can be used to adsorb water or water vapor, as well as a thermal mass. That is to say, in other words, that the catalytic converter or in particular its coating acts as a sponge for water and binds it for a relatively long time.

When the internal combustion engine is (re)started, the exhaust gas flowing through the catalytic converter then gradually heats the carrier body of the catalytic converter and the coating. In the process, a temperature profile forms in the direction of flow of the exhaust gas in the catalytic converter so that at first the highest temperatures are present at the exhaust gas inlet side and those temperatures then decrease in the direction of flow. In this case, it is then proposed in particular that the control probe already have a temperature of at least 70° C., in particular of at least 90° C. [degrees Celsius], before the catalytic converter or the carrier body of the catalytic converter in a plane parallel to the gas inlet side at a distance of 10 mm, has reached a temperature of 95° C. The accumulated water increasingly vaporizes in a range above an average of 95° C. and propagates in the direction of flow of the catalytic converter, and it condenses again if it arrives at colder regions. In this way, a type of "water vapor front" is generated through the catalytic converter. By ensuring a certain temperature of the control probe, it is made certain that the control probe does not constitute such a heat sink when in contact with the water vapor front that water condenses. This ensures the functionality of the individual control probe.

In accordance with a further mode of the invention, the control probe determines at least one of the following components of the exhaust gas: hydrocarbon, carbon monoxide, oxygen. Furthermore, it is also possible to measure a partial pressure, a temperature or other physical measuring variables through the use of this control probe.

In accordance with an added mode of the invention, the control probe is a lambda probe being simultaneously used to check the conversion capability of the at least one catalytic converter. In particular, this is what is referred to as a broadband lambda probe (lambda probe) which outputs a continuous, for example linear, output signal as a function of the oxygen content in the exhaust gas in the range around lambda=1 (for example with a tolerance of ±0.005). This signal is used to control the mixture in accordance with the predefined setpoint or desired values. With the embodiment of the control probe proposed in this case, it is possible to locate the probe relatively far down in the catalytic converter, in particular at a distance of 25 mm to 60 mm. In this region, the lambda oscillations are frequently already reduced or smoothed by more than 50%, in some cases even by more than 90%. The use of such a broadband lambda probe also to the same extent permits a high degree of measuring accuracy, and an extremely low tendency to poisoning occurs by virtue of its position in the catalytic converter, so that a mean value for lambda can also be found to occur precisely and over a relatively long time period. The oxygen content determined with the lambda probe can additionally also be used as a measure of the conversion capability of the catalytic converter. Reference is made to the explanations given at the beginning with respect to this process. It is possible to easily carry out onboard diagnostics with such a lambda probe. As a result, a method is specified which has a particularly simple structure and at the same time permits lambda control of the internal combustion engine and onboard diagnostics.

In accordance with an additional mode of the invention, the exhaust gas which is generated by the internal combustion engine is mixed in the exhaust gas line before it reaches the control probe. Due to the situation or position of the control probe in the exhaust gas line, only certain peripheral flows of the exhaust gas are always sensed and evaluated. In order to ensure that a result which is representative of the entire exhaust gas flow is obtained, the exhaust gas flow is mixed before it reaches the control probe. It is then possible to assume that the position of the individual control probe with respect to the exhaust gas line does not have a significant adverse effect on the result of the measurement. Separate flow mixers (static or dynamic) and/or particular embodiments of the catalytic converters and/or other exhaust gas treatment devices can also be provided for mixing the exhaust gas.

In accordance with yet another mode of the invention, the at least one catalytic converter is used to treat at least one of the following components of the exhaust gas: hydrocarbon, carbon monoxide, nitrogen oxide, particles. In particular, in this case, there is a metallic catalyst carrier body or a ceramic honeycomb structure which is provided with a coating that acts catalytically on at least one of the above-mentioned components and contributes to its conversion. In addition to the catalytic function, the catalytic converter can, for example, also have absorptive functions and/or filtering functions and/or further functions. The coating is advantageously neutral to oxygen in this case, in order to avoid having an adverse effect on the measurement result.

With the objects of the invention in view, there is also provided an exhaust gas system. The exhaust gas system comprises a mobile internal combustion engine and at least one exhaust gas line communicating with the mobile internal combustion engine. At least one catalytic converter is disposed in the at least one exhaust gas line. Just one individual control probe is disposed in the interior of the at least one catalytic converter. A control unit is connected to the control probe for controlling a fuel mixture for the internal combustion engine.

The measurement results of the control probe are evaluated through the use of the control unit and primarily the composition of the fuel mixture or else also the ignition time, the injection pressures, etc. are varied in accordance with predefined setpoint values stored there. As a result, the system of a control probe disposed upstream and a trimming probe disposed downstream is dispensed with and replaced by a system including an individual control probe which projects into internal regions of the at least one catalytic converter. This significantly reduces the susceptibility to faults, the technical complexity and the costs.

In accordance with another feature of the invention, the control probe is disposed at a distance of 10 mm to 80 mm from an exhaust gas inlet side of the at least one catalytic converter. Trials have shown that depending on the internal combustion engine, the distance specified herein is sufficient to ensure that, when a cold start of the internal combustion engine is performed and there is simultaneous electrical heating of the control probe, the control probe has a temperature above 70° C. before it is reached by the water vapor front described above. The control probe is advantageously positioned at a distance of 25 mm to 60 mm from the exhaust gas inlet side.

In accordance with a further feature of the invention, the control probe is a heatable lambda probe. While it is basically possible for the control probe to be heated to the necessary temperature after a cold start simply by the exhaust gas flowing past, in this case it is advantageously proposed that the lambda probe can be heated, in particular through the use of an electric heating conductor structure which is integrated into the lambda probe. When the internal combustion engine is started, this heating conductor structure has current applied to it so that the components of the lambda probe which project into the exhaust gas line and come into contact with the exhaust gas are quickly raised to temperatures above 70° C.

In accordance with an added feature of the invention, measures for reducing a propagation speed of water or water vapor are provided in at least one region of the at least one catalytic converter between an exhaust gas inlet side and the control probe. This means, in particular, that the water or the water vapor cannot move through the region of the catalytic converter at the same speed as the exhaust gas. Some of these possibilities for reducing the propagation speed of water or water vapor are described in the following paragraph.

In accordance with an additional feature of the invention, at least one region of the at least one catalytic converter between an exhaust gas inlet side and the control probe is embodied with channels and at least one of the following features:
 a cell density of 600 to 1200 cpsi [cells per square inch];
 openings in channel walls of the channels;
 mixer structures;
 a porous surface of the channels;
 a coating with a storage capability for at least water or water vapor; and
 metal channel walls with a thickness in the range of from 40 μm to 110 μm (micrometers).

The structure of a catalytic converter with channels is known. They are preferably what are referred to as honeycomb bodies which have a multiplicity of channels that are disposed substantially parallel to one another. The channels can basically be formed by metallic or ceramic channel walls.

The term "cell density" means the number of cells per unit of cross sectional area of the catalytic converter or of the honeycomb structure. The term "cpsi" refers to the unit "cells per square inch" which is generally used in this technical field. 1 cpsi corresponds in this case to approximately 6.4516 cells per square centimeter. The range of 600 cpsi to 1200 cpsi indicated herein is relatively high and represents a very large surface as well as a relatively high thermal mass in this region. As a result, both a large contact area for water or water vapor and at the same time also a relatively high thermal capacity are made available so that particularly in the cold start phase of the internal combustion engine, the water or the water vapor is satisfactorily bound or held in this case.

Providing openings in the channel walls permits partial gas flows which flow through the individual channels to mix together. As a result, the temperature and concentration of the exhaust gas are equalized over the cross section of the catalytic converter so that a characteristic measured value is made possible for the entire exhaust gas flow through the use of the control probe, irrespective of the position of the catalytic converter in the exhaust gas system.

In order to promote this mixing effect it is proposed that mixer structures be provided in the at least one region. Mixer structures are to be understood in particular as elevations, baffles, etc. which project at least partially into internal regions of the channels or bring about pressure differences or direct flows in some other way. They force the partial gas flows to adjacent channels so that sufficient mixing of the partial gas flows with one another is ensured.

A porous surface of the channels provides sufficient accumulation and absorption possibilities for water or water vapor. In this case, in particular, porous surfaces or materials of the channel walls themselves are meant, for example also of the carrier body of the catalytic converter or the honeycomb structure.

In addition, the channels or their surface can be provided with a coating which has a storage capability for at least water or water vapor. This means that it is hygroscopic, for example. This delays the propagation of the water vapor front so that again the control probe is provided with the time which it requires to reach the corresponding temperatures. Under certain circumstances it is advantageous if the storage capability in the region mounted in front is greater than in a partial section downstream of the control probe.

As a further measure it is also possible for the catalytic converter to be constructed with a metallic catalyst carrier body. In this case, metallic channel walls with a thickness in the range of from 40 μm to 110 μm (micrometers) are preferred. These in turn make available the favorable, high thermal capacity which prevents rapid vaporization of adsorbed or absorbed water.

Basically, it is to be noted that it is advantageous to combine at least two of the above-mentioned features with one another.

In accordance with yet another feature of the invention, the control probe has a coating with at least one storage capability for at least water or water vapor or a catalytic activity for at least one component of the exhaust gas. In one advantageous embodiment, the coating has both capabilities. A storage capability up to a temperature at which the catalytic activity starts is preferably provided in this case.

With the objects of the invention in view, there is concomitantly provided a vehicle, comprising the exhaust system according to the invention.

The vehicle is intended in this case to mean in particular a passenger car, a truck, a motorbike, a motorboat, a motorized aircraft, etc.

Irrespective of the control probes described up until now, a measuring sensor, in particular the lambda probe, can be provided with a protective cap which advantageously protects the measuring sensor against water impacts. Water impacts are understood to be the impacting of water droplets on the measuring sensor or else the condensing out of water vapor onto it. The function, in particular, of lambda probes is at least adversely affected by water impacts and the probe can even be made entirely unusable by water impacts.

The water impacts can advantageously be prevented if the protective cap heats up more quickly than the honeycomb structure or the honeycomb body into which the measuring sensor is inserted. The protective cap preferably reaches, as quickly as possible, a temperature at which condensing out of water vapor on the surface of the measuring sensor is reliably avoided. This is achieved, for example, by virtue of the fact that the protective cap is formed from a material which has a significantly lower thermal capacity, in particular specific thermal capacity, than the material from which the honeycomb body is formed. A material is preferably selected which has a specific thermal capacity such that in the normal operating state it is ensured that if the honeycomb body is at a temperature above the boiling point of water in the direction of flow upstream of the measuring sensor, the protective cap is also at a temperature above the boiling point of water, specifically even if the honeycomb body is still at a temperature below the boiling point of water directly adjacent the measuring sensor downstream of the honeycomb body in the direction of flow. To the same extent, it is advantageous that if the honeycomb body is at a temperature above the boiling point of water upstream of the measuring sensor in the direction of flow, the thermal capacity, in particular specific thermal capacity of the protective cap, is selected such that it is at such a temperature that under specific operating conditions the dew point of water on the measuring sensor or the protective cap is reliably avoided, thus effectively avoiding the condensing out of water on the measuring sensor or the protective cap.

A further possible way of constructing a corresponding protective cap is to change the heat transfer coefficient α of the protective cap. By adapting this heat transfer coefficient α it is also possible to ensure that the measuring sensor or the protective cap will quickly reach a temperature which effectively prevents the condensing out of water vapor which arises due to vaporization within the honeycomb body. The protective cap can be embodied as a separate component or else embodied integrally on the measuring sensor. The protective cap can also be combined with the control probes according to the invention.

Other features which are considered as characteristic for the invention are set forth in the appended claims, noting that the features specified individually in the claims can be combined with one another in any desired technically appropriate way and specify further embodiments of the invention.

Although the invention is illustrated and described herein as embodied in a method for controlling a fuel mixture, an exhaust gas system having a mobile internal combustion engine and a vehicle having an exhaust gas system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE EMBODIMENTS

Figure 1:
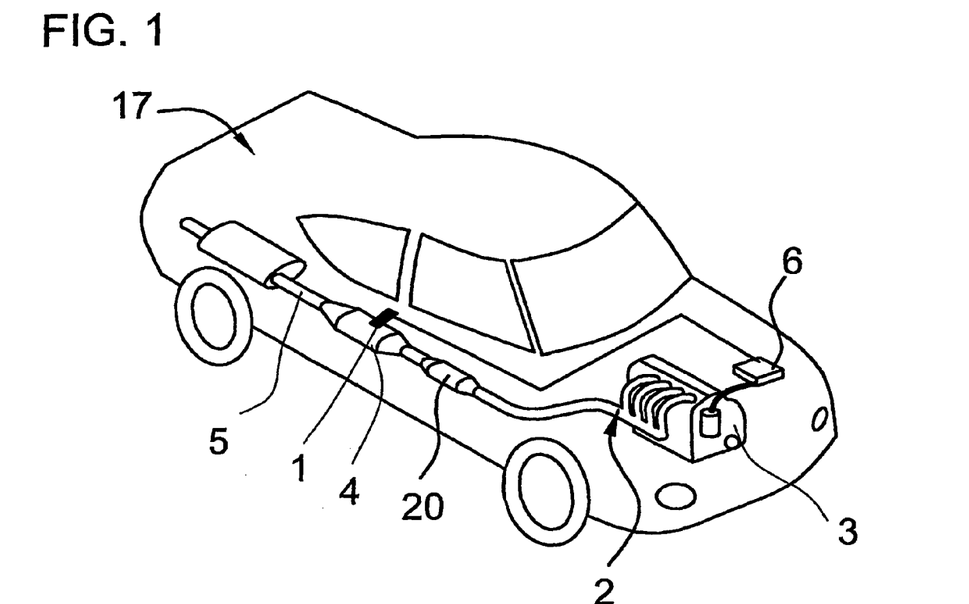
FIG. 1 is a diagrammatic, perspective view of a vehicle with an exhaust gas system.

Referring now to the figures of the drawings in detail and first, particularly, to FIG. 1 thereof, there is seen a diagrammatic and perspective view of a vehicle 17 with an internal combustion engine 3 and an associated exhaust gas system 2. In particular, diesel and spark ignition engines can be provided as the internal combustion engine 3. The exhaust gas which is generated through the use of the internal combustion engine 3 is output into the surroundings through an exhaust gas line 5. For this purpose, the exhaust gas is brought into contact with exhaust gas treatment devices such as, for example, catalytic converters, adsorbers, particle traps etc., with pollutants in the exhaust gas being at least partially converted into at least less noxious components.

In FIG. 1, the exhaust gas firstly flows through a mixer 20 before it is fed to a catalytic converter 4. The catalytic converter 4 is equipped with a control probe 1 for controlling a fuel mixture or for performing onboard diagnostics of the catalytic converter 4. The control probe 1 protrudes into internal regions of the catalytic converter 4. The control probe 1 is connected to a control unit 6, in particular an engine controller. The control unit 6 then varies a composition of the fuel mixture as a function of a parameter sensed through the use of the control probe 1 and predefined values saved therein.

Figure 2:
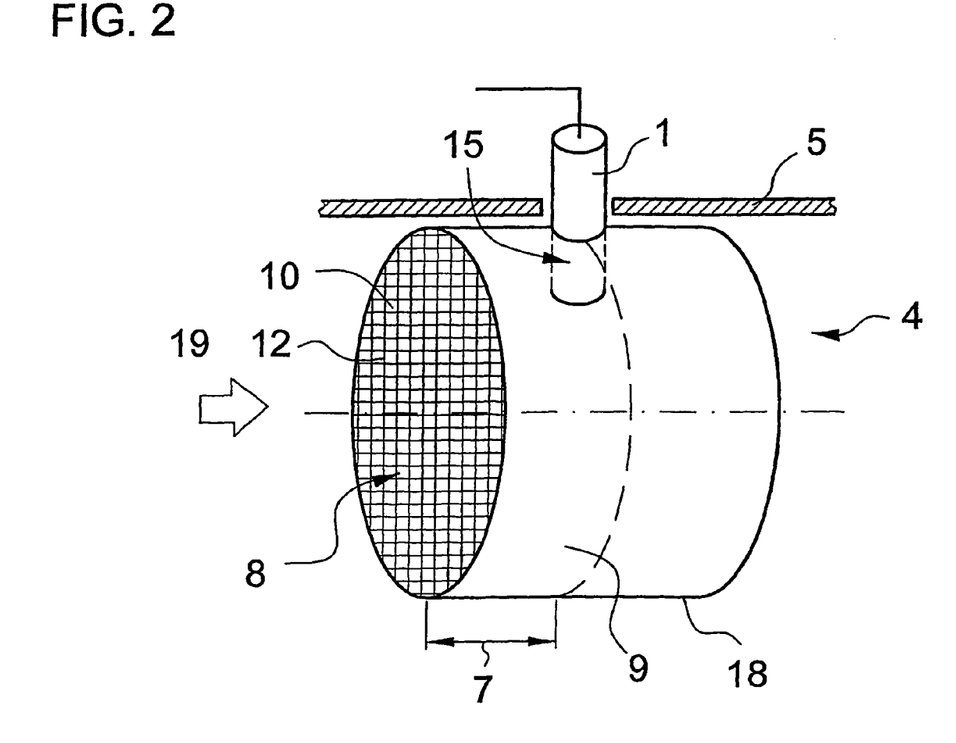
FIG. 2 is a partly-sectional, perspective view of a catalytic converter with a control probe.

FIG. 2 is a sectional view of a catalytic converter 4 with a control probe 1. The control probe 1 is introduced through the exhaust gas line 5 into internal regions of the catalytic converter 4. The catalytic converter 4 is embodied in this case with a housing 18 in which a honeycomb structure through which the exhaust gas can flow is provided. The honeycomb structure is formed by a multiplicity of channel walls 12 which provide channels 10 through which the exhaust gas can flow. The exhaust gas flows in a flow direction 19 and impinges on an exhaust gas inlet side 8. A region 9 which has measures for limiting a propagation speed of a water vapor front which propagates through the catalytic converter 4 when the internal combustion engine is (re)started, is provided between the exhaust gas inlet side 8 and the control probe 1. In order to ensure that after a cold start, the control probe 1 has reached temperatures above 70° C. before this water vapor front has reached the control probe 1, the control probe 1 is positioned at a distance 7 of 10 to 80 mm (millimeters) from the exhaust gas inlet side 8. It is to be noted in this case that the distance 7 indicated herein is illustrated diagrammatically, that is to say the exact ratio of the entire length of the catalytic converter 4 to the distance 7 in the flow direction 19 is not indicated.

Figure 3:
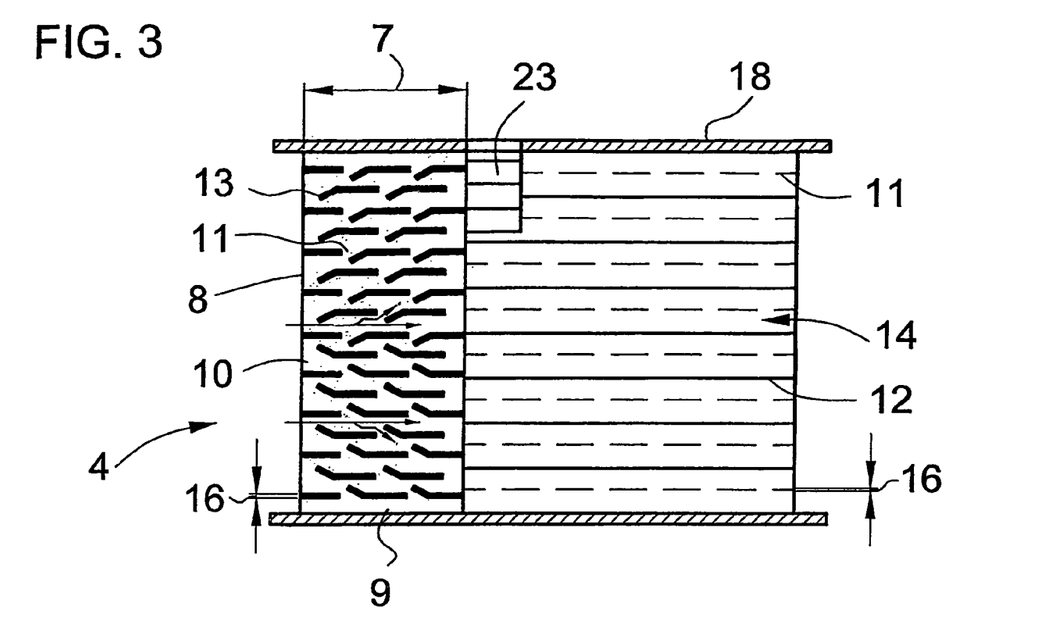
FIG. 3 is a longitudinal-sectional view of a catalytic converter.

FIG. 3 shows a further embodiment of a catalytic converter 4 in a longitudinal section. The catalytic converter 4 in turn has a housing 18 and a region 9 which extends from the exhaust gas inlet side 8 over a distance 7. In this case, the catalytic converter 4 has a metallic catalyst carrier body, so that the channel walls 12 are therefore of metallic origin in this case.

Within the region 9, the channels or passageways 10 are bounded by channel walls 12 which have a thickness 16 that is larger than in other regions of the catalytic converter. At the same time, openings 11 and mixer structures 13 are provided which permit adjacent partial gas flows to mix together. This can ensure that the control probe 1 which is to be inserted into a recess 23 can supply qualified results about the composition of the exhaust gas.

Figure 5:
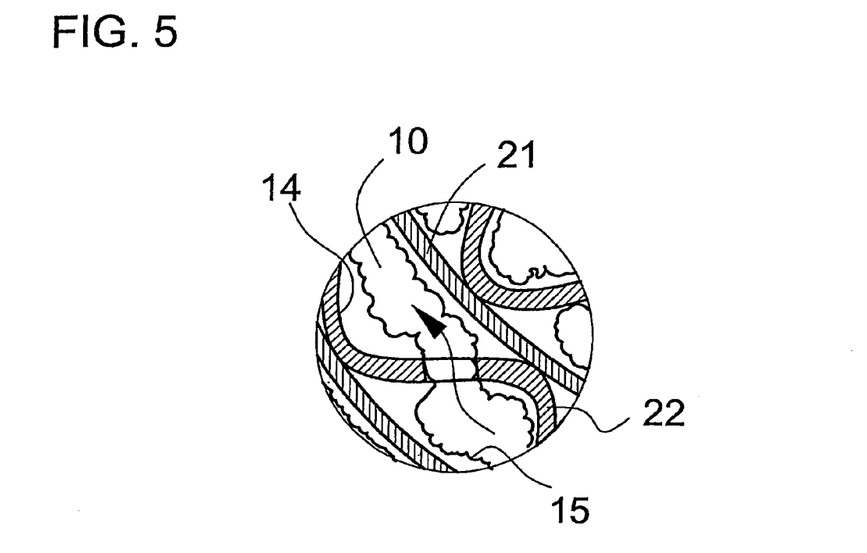
FIG. 5 is a fragmentary, cross-sectional view of the catalytic converter of FIG. 4.

The channels are bounded by relatively thin channel walls 12 downstream of the region 9. It is also possible, for example, to provide a surface 14 of the channels 10 with a coating 15, which is indicated in FIG. 5. In the embodiment illustrated herein, the channel walls 12 are also provided with openings 11 in the region located downstream. The different regions 9 of the catalytic converter 4 can, if appropriate, also be formed by various separate honeycomb structures or carrier bodies (spaced apart with a gap if appropriate).

Figure 4:
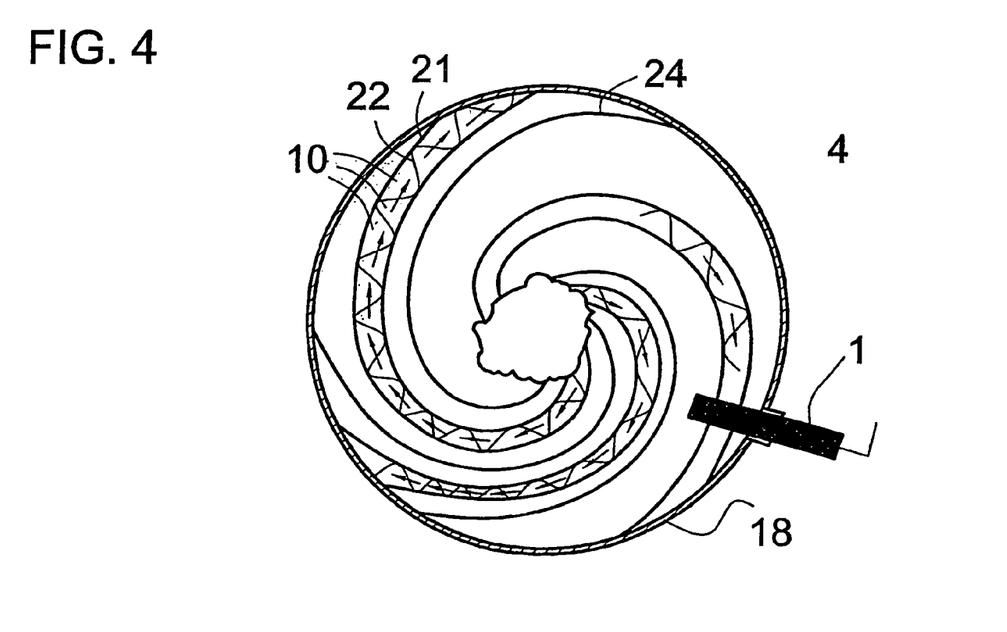
FIG. 4 is a cross-sectional view of a further embodiment of a catalytic converter.

FIGS. 4 and 5 also show a further embodiment of a catalytic converter 4 with a control probe 1. The catalytic converter 4 in turn has a housing 18. The internal honeycomb structure is formed by smooth foils 21 and corrugated foils 22 which are twisted together in the form of an involute and brazed together (in particular high-temperature brazed). It is apparent from the end view that the smooth foils or films 21 and the corrugated foils or films 22 respectively form layers 24. It is also possible to mix the adjacent channels 10 within these layers 24. It is apparent from the fragmentary view of FIG. 5, that the smooth foils 21 and the corrugated foils 22 are positioned so as to alternate with one another and in this way form the channels 10. The catalytically active coating 15 is provided on the surface 14 of the channels 10.

Figure 6:
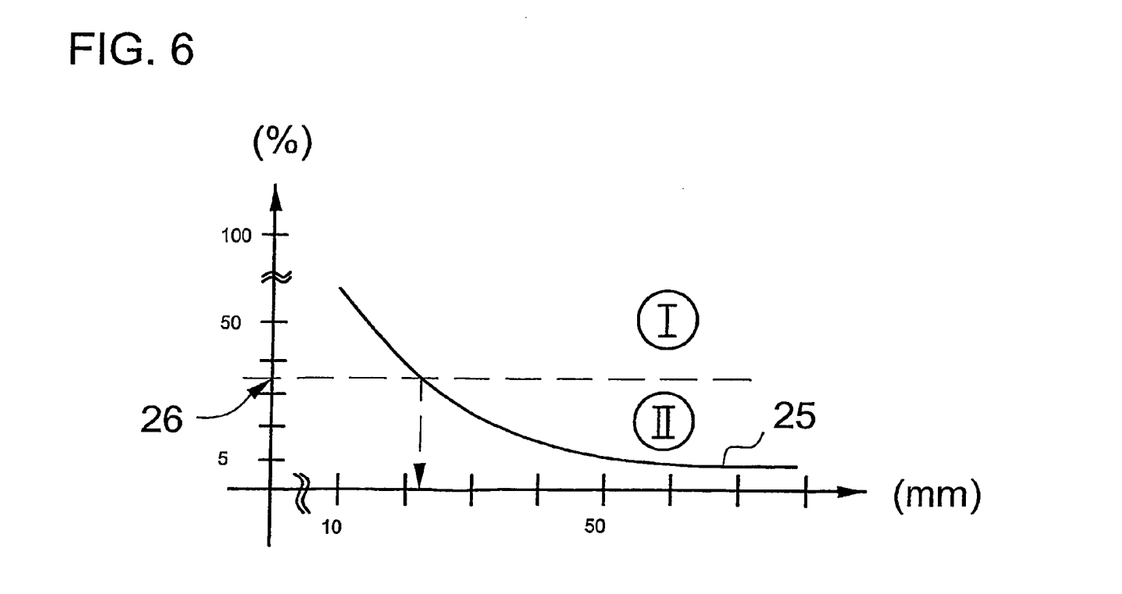
FIG. 6 is a diagram illustrating a measuring quality of the control probe as a function of a position with respect to the catalytic converter.

FIG. 6 is a diagram relating to the measuring quality of the control probe as a function of the position relative to the catalytic converter. The abscissa shows, by way of example, the distance 7 between the control probe 1 and the exhaust gas inlet side 8 in millimeters. The ordinate shows, by way of example, the reduction in the lambda control oscillation as a percentage. It is apparent therefrom that even after a few millimeters, for example 10 mm, a significant reduction in the lambda oscillation, in particular by at least 50%, has already occurred. Under certain circumstances, reductions of more than 80% can therefore already be present, given a distance of 40 mm or even 95% given a distance of 60 mm. The illustrated curve 25 is diagrammatic and is intended to illustrate a profile. In order to obtain a measurement result which is sufficiently precise for the lambda control, it is proposed in this case, under certain circumstances, to select different embodiments depending on the position of the control probe. For this purpose, a limiting value 26 has been shown and it is possible for that limiting value 26 to be considered to be a measure of the sensitivity of the control probe. A range identified by "I" is intended to characterize a range of use for a jump probe, and a range identified by "II" is intended to characterize that of a broadband linear probe. It is apparent therefrom, for example, that up to a distance of approximately 20 mm (in other cases up to 40 mm) a jump probe is advantageous (low costs, sufficiently precise) and in the case of a distance above this, a broadband linear probe should be used for control.

Figure 7:
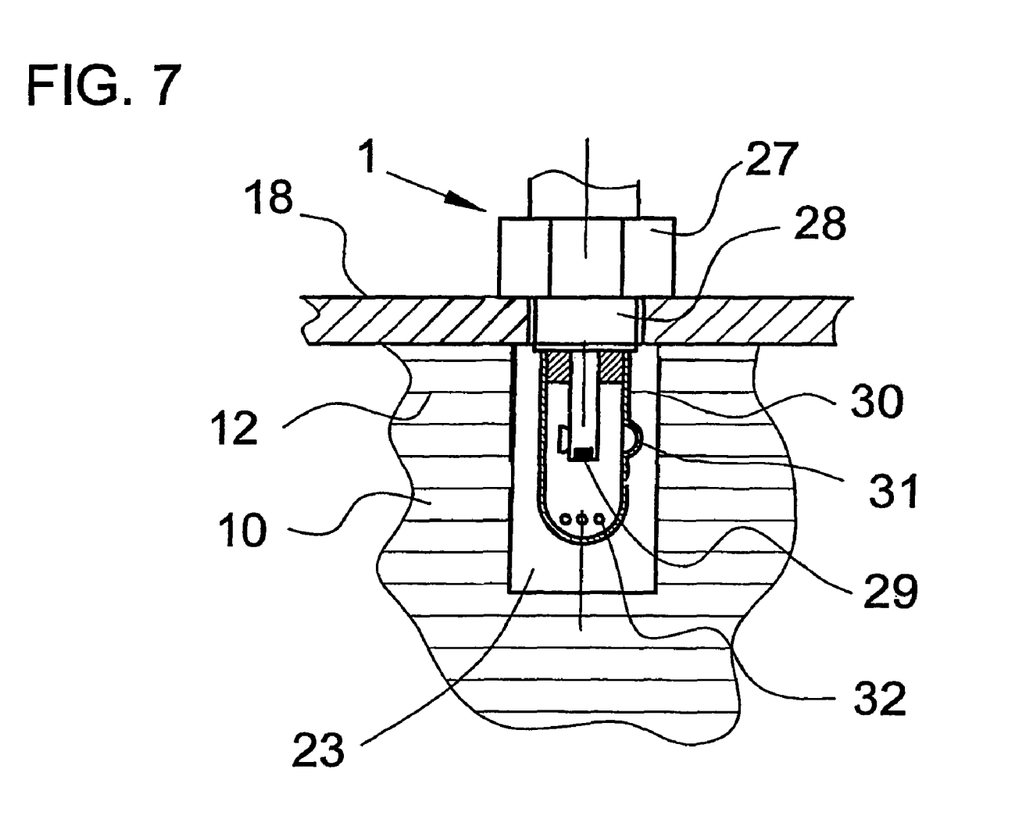
FIG. 7 is an enlarged, fragmentary, longitudinal-sectional view showing a structure of a control probe.

FIG. 7 is a diagrammatic view of the structure of a control probe 1 in an installed position. The control probe 1 which is described below represents a particularly preferred embodiment which can, if appropriate, also be used as a single control probe 1, for example downstream of a catalytic converter 4. The probe 1 has a nut 27 and a threaded section 28 for securing it to the housing 18. A sensitive region 29 then projects into a recess 23 in the catalytic converter 4 having the channel walls 12 which define the channels 10.

Due to the above-described protective measures provided for the sensitive region 29 through the use of the catalytic converter 4 as a damping element (for example relating to the temperatures, pollutant concentrations, pressure fluctuations, water content in the exhaust gas), it is possible for the control probe 1 to be exposed directly to the stream of exhaust gas and a protective cap which is usually used can therefore be dispensed with. However, under certain circumstances, for reasons of protecting the sensitive region 29 during storage, transportation, assembly, etc., it is nevertheless necessary to provide a cap 30. However, the cap 30 is constructed in such a way that it has a particularly low absorptive capacity for heat, in particular less than 1 J/K [Joules per Kelvin] or even less than 0.8 J/K. This can be achieved, for example, through the use of a particularly thin-walled cap 30, a porous cap 30, a cap 30 which has a large number of openings 32, a very small cap 30, etc. This cap 30 is preferably manufactured from a steel material and is manufactured, in particular, through the use of a shaping fabrication method (for example deep drawing). In addition, baffles 31 can be provided which permit the exhaust gas to flow along to the sensitive region 29 in a suitable manner and, if appropriate, also result in a longer dwell time of the exhaust gas in the interior of the cap 30. If the cap 30 is at least partially coated, the parameter specified above relates to the cap 30 including the coating. Such an embodiment of the control probe 1 can also advantageously be used independently of the control method described herein, in particular with an exhaust gas system in which this control probe 1 is disposed downstream of a catalytic converter 4.

I claim:

1. A method for controlling a fuel mixture, the method comprising the following steps:
   providing a mobile internal combustion engine exhaust gas system having an exhaust gas line with at least one catalytic converter;
   providing one individual control probe in an interior of the at least one catalytic converter; and
   carrying out the fuel mixture control solely with the only one individual control probe.

2. The method according to claim 1, which further comprises heating the control probe after the internal combustion engine starts, to reach a temperature of at least 70° Celsius before the at least one catalytic converter has reached 95° Celsius.

3. The method according to claim 1, which further comprises determining with the control probe at least one component of the exhaust gas selected from the group consisting of hydrocarbon, carbon monoxide, nitrogen oxide and oxygen.

4. The method according to claim 1, wherein the control probe is a lambda probe, and simultaneously using the lambda probe to check a conversion capability of the at least one catalytic converter.

5. The method according to claim 1, which further comprises mixing exhaust gas generated by the internal combustion engine in the exhaust gas line before the exhaust gas reaches the control probe.

6. The method according to claim 1, which further comprises using the at least one catalytic converter to treat at least one component of the exhaust gas selected from the group consisting of: hydrocarbon, carbon monoxide, nitrogen oxide and particles.

7. An exhaust gas system, comprising:
   a mobile internal combustion engine;
   at least one exhaust gas line communicating with said mobile internal combustion engine;
   at least one catalytic converter disposed in said at least one exhaust gas line and having an interior;
   only one individual control probe, said one individual control probe disposed in said interior of said at least one catalytic converter; and
   a control unit connected solely to said one individual control probe for monitoring at least a part of the exhaust gas in the exhaust gas system in order to control a fuel mixture for said internal combustion engine.

8. The exhaust gas system according to claim 7, wherein said at least one catalytic converter has an exhaust gas inlet side, and said control probe is disposed at a distance of 10 mm to 80 mm from said exhaust gas inlet side.

9. The exhaust gas system according to claim 7, wherein said control probe is a heatable lambda probe.

10. The exhaust gas system according to claim 7, wherein said at least one catalytic converter has an exhaust gas inlet side and at least one region between said exhaust gas inlet side and said control probe, and a device for reducing a propagation speed of water or water vapor is disposed in said at least one region.

11. The exhaust gas system according to claim 10, wherein said at least one region has channels and at least one feature selected from the group consisting of:
   a) a cell density of 600 to 1200 cpsi (cells per square inch);
   b) openings in channel walls of said channels;
   c) mixer structures;
   d) a porous surface of said channels;
   e) a coating with a storage capability for at least water or water vapor; and
   f) metallic channel walls with a thickness in a range of from 40 μm to 110 μm.

12. The exhaust gas system according to claim 7, wherein said control probe has a coating with at least one storage capability for at least water or water vapor or a catalytic activity for at least one component of the exhaust gas.

13. A vehicle, comprising an exhaust gas system according to claim 7.

* * * * *